United States Patent Office 2,891,040
Patented June 16, 1959

2,891,040
ETHYLENE POLYMERIZATION PROCESS

William Joseph Linn, Wilmington, Del., assignor to E. I. du Pont de Nemours & Company, Wilmington, Del., a corporation of Delaware No Drawing. Application August 16, 1955
Serial No. 528,843

9 Claims. (Cl. 260—94.9)

This invention relates to an improved process for polymerizing ethylene.

It has recently been reported (U.S. Patents 2,692,257 and 2,692,258) that a catalyst composed of a molybdenum-oxygen compound in which the molybdenum is present in some measure in the sub-hexavalent state, in combination with alumina or an oxide of titanium or zirconium, is effective for the polymerization of ethylene to solid polymers.

It has now been discovered, in accord with this invention, that highly active catalysts for polymerizing ethylene to solid polymers are obtained by admixing a halide of molybdenum in which the molybdenum is in the pentavalent or hexavalent state with a titanium or zirconium halide.

This invention accordingly provides an improved process for polymerizing ethylene to solid polymers employing a new catalyst combination which is active under relatively mild conditions of temperature and pressure.

The polymerization of the ethylene can be effected under conditions of temperature and pressure varying from 25° to 250° C. and 3 to 300 atmospheres with a catalyst comprising a halide of molybdenum in the hexavalent or pentavalent state in combination with a titanium or zirconium halide in which the valence of the titanium or zirconium is 4 or less than 4.

In a convenient method of operation, a pressure reactor of about 400 cc. capacity is charged, in the absence of air, with the catalyst and an organic reaction medium, e.g. xylene, in amount sufficient to occupy about one-fourth of the reactor volume. Thereafter ethylene is admitted to about 30 atmospheres and the charged reactor placed in a reciprocating rack equipped with heating means. Heating and agitation are started and additional ethylene is added to maintain the pressure at 30 to 150 atmosphperes, while the temperature is raised to a value within the range from 25° to 250° C. The polymerization is permitted to proceed until the rate of ethylene absorption becomes slow, for example, from four to sixteen hours. Thereafter the reactor is cooled, opened, and the contents discharged. Solid ethylene polymer and catalyst may be separated from solvent and oily polymer by filtration. Solid polymer is then recovered from the filter cake by extraction with one or more organic solvents, suitably boiling benzene to dissolve polymers of lower molecular weight, followed by boiling xylene to dissolve polymer of higher molecular weight. The ethylene polymers may be precipitated from the extracts by dilution with methanol.

The examples which follow are submitted to illustrate and not to limit this invention.

Example I

A 400 ml. silver-lined pressure reactor was flushed with nitrogen and charged with 4.79 g. of molybdenum penta-chloride, 9.4 g. of zirconium tetrachloride and 100 ml. of xylene. The reactor was cooled in a solid carbon dioxide bath, evacuated and pressured with ethylene. The reactor was agitated by means of a reciprocating rack and heated electrically. For a period of eight hours, the temperature was maintained at 51–76° C. and ethylene added to maintain pressure at 600–1000 lb./sq. in. The temperature was then raised to 170° C. for an additional eleven hours. Ethylene pressure was maintained at 1000–1200 lb./sq. in. The reactor was then cooled and the contents discharged. The paste-like mixture of solvent, solid and liquid polymer weighed 177 g. In order to remove liquids and low molecular weight polymer, the reaction mixture was treated with methanol in a Waring Blendor and filtered. The air-dried filter cake was extracted with boiling benzene to remove low molecular weight solid polymer which was precipitated from the benzene solution by dilution with methanol. The weight of this fraction was 12.5 g.

Higher molecular weight solid polyethylene was then recovered by extracting the residue with boiling xylene. The polymer which was precipitated from xylene solution by methanol dilution weighed 15.6 g.

Example II

Example I was repeated except that the reactor was charged with 4.83 g. of molybdenum pentachloride, 2.68 g. of titanium trichloride and 100 ml. of xylene. Over a period of 15 hours, the temperature was maintained at 54–65° C. and the pressure maintained at 500–1000 lb./sq. in. by repressuring with ethylene. The pressure drop during this period amounted to 3835 lb./sq. in. The total weight of the pasty mass recovered from the reactor was 267 g. The crude solid polymer obtained by treating the reaction mixture with methanol and filtering weighed 137 g.

This crude polymer was fractionated as before by successive benzene and xylene extractions. The low molecular weight waxy polymer weighed 62.5 g. and the higher molecular weight polyethylene recovered by xylene extraction weighed 28.5 g.

Example III

Example I was repeated except that the reactor was charged with 6.50 g. of molybdenum pentachloride, 2.5 ml. of titanium tetrachloride and 125 ml. of xylene. Over a period of 14.5 hours, the temperature was maintained at 72–74° C. The reactor was repressured with ethylene at frequent intervals to maintain a pressure of 1000 lb./sq. in. The crude solid obtained from the reactor was washed twice with methanol in a Waring Blendor. The crude polymer mixture was then fractionated by successive benzene and xylene extractions. The polymer was precipitated from solution by methanol dilution. The weight of benzene extractable polymer was 17.6 g. and that of the xylene soluble was 19.5 g.

Example IV

A 400 ml. silver-lined reactor was flushed with nitrogen and charged with 100 ml. of xylene and 6.0 g. of zirconium tetrachloride. The reactor was cooled in a solid carbon dioxide bath and 5–6 g. of molybdenum hexafluoride added by distillation from a cylinder. The reactor was then agitated and pressured with ethylene. Ethylene absorption was rapid in the temperature range 60–68° C. at a pressure of 900 lb./sq. in. which was maintained by periodic repressuring. The solid recovered from the reactor was washed twice with methanol in a Waring Blendor, collected by filtration and air-dried. The polymer was extracted successively with benzene and xylene as described above. In this manner there was obtained 44.0 g. of low molecular weight, waxy polymer and 35.4 g. of higher molecular weight polyethylene.

The catalysts used in the process of this invention are combinations of a molybdenum halide in which the molybdenum is hexavalent or pentavalent with either a titanium or zirconium halide in which the titanium or zirconium is in a valence state of four or less. Halides of hexavalent and pentavalent molybdenum are $MoF_6$ and $MoCl_5$, and halides of titanium and zirconium are $TiCl_4$, $TiCl_3$, $TiF_4$, $TiBr_4$, $TiI_4$, $TiCl_2$, $ZrCl_4$, $ZrF_4$, $ZrCl_3$, $ZrBr_3$, $ZrCl_2$, and $ZrBr_2$.

Hydrocarbons such as xylene, cyclohexane, isooctane, decahydronaphthalene, etc., constitute preferred reaction media, and the molybdenum pentachloride may be dissolved or suspended therein. For maximum catalytic activity, the second component of the catalyst, which may be insoluble in the reaction medium, should be finely divided or dispersed.

The ratio of molybdenum hexahalide or pentahalide to titanium or zirconium halide is not critical. The molar, ratio of the molybdenum hexahalide or pentahalide to the second component, however, is generally within the range of approximately 0.1 to 10. For best results, however, catalysts are used in which the ratio of molybdenum hexahalide or pentahalide to the second component is approximately equimolar.

The manner in which the molybdenum hexahalide or pentahalide and other component interact to form a catalyst is not known. Merely contacting the two appears to suffice. However, it is desirable to employ efficient agitation. It is also desirable to avoid exposure to moisture and oxygen prior to and during use.

The molybdenum hexahalide or pentahalide and titanium or zirconium halide may, if desired, be pre-reacted for example, in the boiling hydrocarbon solvent at atmospheric pressure, or in situ at higher temperatures under autogenous pressure. It appears, however, that no pre-reaction is necessary beyond that taking place as the temperature if the reactor is raised to the temperature at which polymerization takes place.

The polymerization of ethylene to solid polymer can be effected at temperatures of 25° to 250° C. and pressures from 3 to 300 atmospheres or above. It is preferred to utilize the lowest practical temperatures and pressures, and satisfactory reaction rates are usually realized at temperatures of 50° to 180° C. and pressures of 500 to 2000 lb./sq. in.

The quantities of molybdenum hexahalide or pentahalide and of titanium or zirconium halide used in appropriate combinations must be sufficient to induce polymerization at a practical rate. Suitably, the quantity will be within the range of 0.001% to 25% by weight of the ethylene charged.

Ethylene from any source may be used provided it is reasonably pure and substantially free of moisture and oxygen. Impurities may induce deleterious side reactions and reduce the yield of solid polymer.

The equipment in which the polymerization is effected may be made of, or lined with, material which has no deleterious effect on the polymerization. Silver-lined pressure reactors are suitable.

Methods for preparing molybdenum hexahalide and pentahalides as well as titanium and zirconium halides are described in the literature.

In the polymerization there are frequently obtained oily and waxy polymers of low molecular weight, along with higher molecular weight polyethylene.

Residual solvent, catalyst, and oil may be separated from the solid polymer in any desired manner, for example by filtration, extraction, or washing procedures. Thus, solid polyethylene of moderate molecular weight may be extracted with boiling benzene and reprecipitated by dilution with methanol. Polyethylene of still higher molecular weight may then be extracted with boiling xylene and reprecipitated with methanol.

While the examples illustrate batch operation, it is within the scope of this invention to conduct the polymerization continuously by, for example, passing the mixture of ethylene and hydrocarbon over the catalysts or by continuously charging ethylene, hydrocarbon, and catalyst.

When used alone, molybdenum pentachloride induces polymerization of ethylene predominantly to oil; a temperature of about 180° C. is required at 2500 lb./sq. in. pressure. When the molybdenum pentahalide is used in combination with a titanium or zirconium halide, polymerization takes place at materially lower temperatures and pressures.

The solid polyethylenes obtained by the process of the present invention are useful for a great variety of applications. Thus, the polymers can be melt-extruded into films, fibers, and wire coatings. The polymers can further be injection molded, cast from solution and converted into foams. Antioxidants, stabilizers, fillers, extruders, plasticizers, pigments, insecticides, fungicides, etc., can be incorporated into the polymers. The polymers can further be subjected to chemical modifying treatments such as halogenation, dehalogenation, sulfonation and other reactions to which hydrocarbons may be subjected.

I claim:

1. Process for polymerizing ethylene which comprises conducting the polymerization at a temperature of 25° to 250° C. in the presence of a catalyst consisting essentially of the product formed by admixing a molybdenum halide having a valence state of 5 to 6, with a member of the class consisting of titanium and zirconium halides in a range of molar ratios of 0.1 to 10.

2. Process for polymerizing ethylene which comprises conducting the polymerization at a temperature of 25° to 250° C. in the presence of an inert, liquid hydrocarbon medium and a catalyst consisting essentially of the product formed by admixing a molybdenum halide having a valence state of 5 to 6 with a titanium halide in a range of molar ratios of 0.1 to 10.

3. Process of claim 2 wherein the molybdenum halide is molybdenum pentachloride.

4. Process of claim 2 wherein the molybdenum halide is molydenum hexafluoride.

5. Process of claim 2 wherein the titanium halide is titanium tetrachloride.

6. Process of claim 2 wherein the titanium halide is titanium trichloride.

7. Process for polymerizing ethylene which comprises conducting the polymerization at a temperature of 25° to 250° C. in the presence of an inert hydrocarbon medium and a catalyst consisting essentially of the product formed by admixing a molybdenum halide having a valence of 5 to 6 with a zirconium halide in a range of molar ratios of 0.1 to 10.

8. Process of claim 7 wherein the molybdenum halide is molybdenum pentachloride.

9. Process of claim 7 wherein the zirconium halide is zirconium tetrachloride.

References Cited in the file of this patent

UNITED STATES PATENTS

| | | |
|---|---|---|
| 2,092,295 | Caudri et al. | Sept. 7, 1937 |
| 2,474,671 | Hersberger | June 28, 1949 |

FOREIGN PATENTS

| | | |
|---|---|---|
| 874,215 | Germany | July 8, 1949 |

UNITED STATES PATENT OFFICE

CERTIFICATE OF CORRECTION

Patent No. 2,891,040 June 16, 1959

William Joseph Linn

It is hereby certified that error appears in the printed specification of the above numbered patent requiring correction and that the said Letters Patent should read as corrected below.

Column 4, lines 21 and 22, strike out "extruders,".

Signed and sealed this 10th day of November 1959.

(SEAL)
Attest:

KARL H. AXLINE
Attesting Officer

ROBERT C. WATSON
Commissioner of Patents